United States Patent [19]

Singh et al.

[11] Patent Number: 5,758,083

[45] Date of Patent: May 26, 1998

[54] METHOD AND SYSTEM FOR SHARING INFORMATION BETWEEN NETWORK MANAGERS

[75] Inventors: Surinder Singh, Cupertino; Robert P. St. Pierre, San Jose, both of Calif.

[73] Assignee: Sun Microsystems, Inc., Palo Alto, Calif.

[21] Appl. No.: 550,087

[22] Filed: Oct. 30, 1995

[51] Int. Cl.$^6$ .................................................. H04B 15/173
[52] U.S. Cl. ........................... 395/200.53; 395/200.54; 395/200.32; 395/680; 370/229; 370/254
[58] Field of Search ............... 395/200.01, 200.02, 395/200.06, 200.09, 200.11, 200.15, 200.54, 200.32, 680; 364/514 A, 514 B, 514 C, 514 R; 370/229, 254

[56] References Cited

U.S. PATENT DOCUMENTS

| | | | |
|---|---|---|---|
| 5,317,568 | 5/1994 | Bixby et al. | 370/85.6 |
| 5,473,608 | 12/1995 | Gagne et al. | 370/85.13 |
| 5,517,622 | 5/1996 | Ivanoff et al. | 395/200.13 |
| 5,634,011 | 5/1997 | Auerbach et al. | 395/200.15 |
| 5,651,006 | 7/1997 | Fujino et al. | 370/408 |

OTHER PUBLICATIONS

Kobielus, "Management the United Way", Network World, Aug. 7, 1995.

Hurwicz, "Management Gets an Agent", LAN Magazine, Sep. 1995.

McConnell, "Goodbye, Centralized SNMP Managers", Mar. 20, 1995.

Hurwicz, "Lower the Net Management Burden Now", Datamation, Oct. 1, 1995.

Duffy, "Cabletron Widens Spectrum", Network World, May 15, 1995.

"Cooperative Consoles™ 1.0 Administrator's Guide" by SunSoft of Sun Microsystems, Inc., Mountain View, CA, 1994.

*Primary Examiner*—James P. Trammell
*Assistant Examiner*—Patrick J. Assouad
*Attorney, Agent, or Firm*—Beyer & Weaver, LLP

[57] ABSTRACT

A technique for managing a network by sharing information between distributed network managers which manage a different portion of a large network is disclosed. By sharing such network information, the network management performed by the distributed network managers can inform site managers not only local network conditions but also about network conditions on other remote networks. A filtering operation is used to determine that portion of the network information deemed important to forward to another network manager. A database synchronization operation is also optionally provided so that databases of each network manager, which store topology information concerning the particular portion of the network, can be automatically synchronized.

37 Claims, 12 Drawing Sheets

METHOD AND SYSTEM FOR SHARING INFORMATION BETWEEN NETWORK MANAGERS

BACKGROUND OF THE INVENTION

1. Field of the Invention

The present invention relates to network management and, more particularly, to techniques for sharing information between network managers.

2. Description of the Related Art

Today's organizations, in particular large corporate organizations, have large networks which are often geographically dispersed. In order for the organizations to operate efficiently, it is necessary that the large networks be properly managed. One way to manage such large networks is to divide or distribute the network management responsibilities among several network management consoles. The network management consoles are typically associated with a particular portion or subnet of the large network. These management consoles are separate in that there is no management interaction between the different network management consoles that are managing portions of the large network.

It is due to the ever increasing size of large networks that the management responsibilities must be divided across several network management consoles. Examples of commercially available network management consoles are SunNet Manager, IBM Netview, and HP Openview. If the management responsibilities are not divided across several network management consoles, then the sole network management console and a site manager making use of the console are overloaded with management information. As a consequence, network management would not be sufficiently efficient or responsive to network conditions.

One existing problem with distributing network management responsibilities across different network management consoles is that the network management provided by each of the network management consoles is isolated from the other management consoles. As a result, the network management is not as efficient or responsive as it should be to fully utilize the networked resources.

Thus, there is a need to manage a large network using distributed network management, while also enabling interaction between the distributed network managers.

SUMMARY OF THE INVENTION

Broadly speaking, the invention is a technique for managing a network by sharing information between distributed network managers which manage a different portion of the network.

More particularly, the invention enables network managers to cooperate with one another so as to share important network information between distributed network management stations. The important network information being shared is information about certain changes in the state of critical network devices or changes in selected aspects of network topology. By sharing such important network information, the network management performed by the distributed network management stations can inform site managers not only of local network conditions but also about network conditions on other remote networks. A filtering operation is used to determine that portion of the network information deemed important to forward to another network management station. A database synchronization operation is also optionally provided so that databases of each network management station, which store topology information concerning the particular portion of the network, can be automatically synchronized.

The invention can be implemented in numerous ways, including as a system, a method, or as a computer readable medium.

As network management system for sharing information between a plurality of distributed network managers, an embodiment of the invention includes: a sending machine, a receiving machine, and a communication link connecting the sending machine and the receiving machine. The sending machine includes at least: a first network manager for receiving event and trap information from agents associated with a first network and for managing the first network; an authorization list containing information indicating whether receiving machines are authorized to receive the event and trap information; and a sender process for receiving the event and trap information received by the first network manager. The receiving machine includes at least: a second network manager for managing a second network; a receiver process for receiving the event and trap information; and a registration list for identifying sender machines to which the receiving machine is to connect to receive event and trap information. The sender process operates to forward the event and trap information to the receiving machine if the authorization list authorizes the receiving machine to receive the event and trap information, and the receiver process forwards the event and trap information received from the sender process to the second network manager for processing thereof.

Additionally, the sender process of the network management system may also filter the event and trap information, and then forward the filtered event and trap information to the receiving machine if the authorization list authorizes the receiving machine to receive the even and trap information.

Also, the first network manager of the network management system typically maintains a first database and the second network manager maintains a second database. It is preferable that the sender process also receives a synchronization request from the receiver process and in response thereto generates a database trap for each record in the first database and then forwards the database traps to the receiver process, and that the receiver process receives the database traps forwarded from the sender process and then synchronize the second database to the first database in accordance with the database traps.

As a network management system for sharing information between a plurality of distributed network managers, another embodiment of the invention includes: a first network manager for managing a first network; a second network manager for managing a second network; and information sharing means for sharing information between the first network manager and the second network manager. Optionally, the embodiment of the invention may further include filter means for filtering the information before being transferred to the second network manager, and/or synchronization means for automatically synchronizing topology information between first and second databases associated with the first and second network managers, respectively.

As a computer-implemented method for sharing network management data between first and second network managers, the first network manager locally managing a first network, and the second network manager locally managing a second network, an embodiment of the invention includes the operations of: connecting a receiver process associated with the second network to a sender process associated with the first network; receiving network management data for the first network at the sender process; forwarding the network management data from the sender process to the receiver process; and processing the network management data in the second network manager. The computer-implemented method may also include one or both of the operations of: filtering the network management data at the sender process to produce filtered data for the receiver process, and automatically synchronizing a second database associated with the second network manager to the first database associated with the first network manager.

As a computer-implemented method for sharing network management data between first and second network managers, the first network manager locally managing a first network, and the second network manager locally managing a second network, another embodiment of the invention includes the operations of: connecting a receiver process associated with the second network to a sender process associated with the first network; receiving network management data for the first network at the sender process; filtering the network management data at the sender process to produce filtered data for the receiver process; forwarding the filtered data from the sender process to the receiver process; and processing the filtered data in the second network manager.

As a computer program product, an embodiment of the invention includes a computer usable medium having computer readable code embodied therein to implement sharing of network management data between first and second network managers, the first network manager locally managing a first network and the second network manager locally managing a second network. The computer readable code includes: first computer readable program code devices configured to cause a computer to effect connecting a receiver process associated with the second network to a sender process associated with the first network; second computer readable program code devices configured to cause a computer to effect receiving network management data for the first network at the sender process; third computer readable program code devices configured to cause a computer to effect forwarding the network management data from the sender process to the receiver process; and fourth computer readable program code devices configured to cause a computer to effect processing the network management data in the second network manager. The computer readable code may further include computer readable program code devices configured to cause a computer to effect filtering of the network management data at the sender process to produce filtered data which is then forwarded to the receiver process, and/or computer readable program code devices configured to cause a computer to effect synchronization of a second database maintained by the second network manager to a first database maintained by the first network manager.

Advantages of the invention include flexibility and efficiency. The invention provides flexibility because it allows for many configurations of a network management system utilizing the invention. The invention provides for improved efficiency in network operation and management by facilitating overall network management and enabling remote site managers to take corrective action to improve network performance by taking into consideration important network information about remote networks which impact performance of the local network.

Other aspects and advantages of the invention will become apparent from the following detailed description, taken in conjunction with the accompanying drawings, illustrating by way of example the principals of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
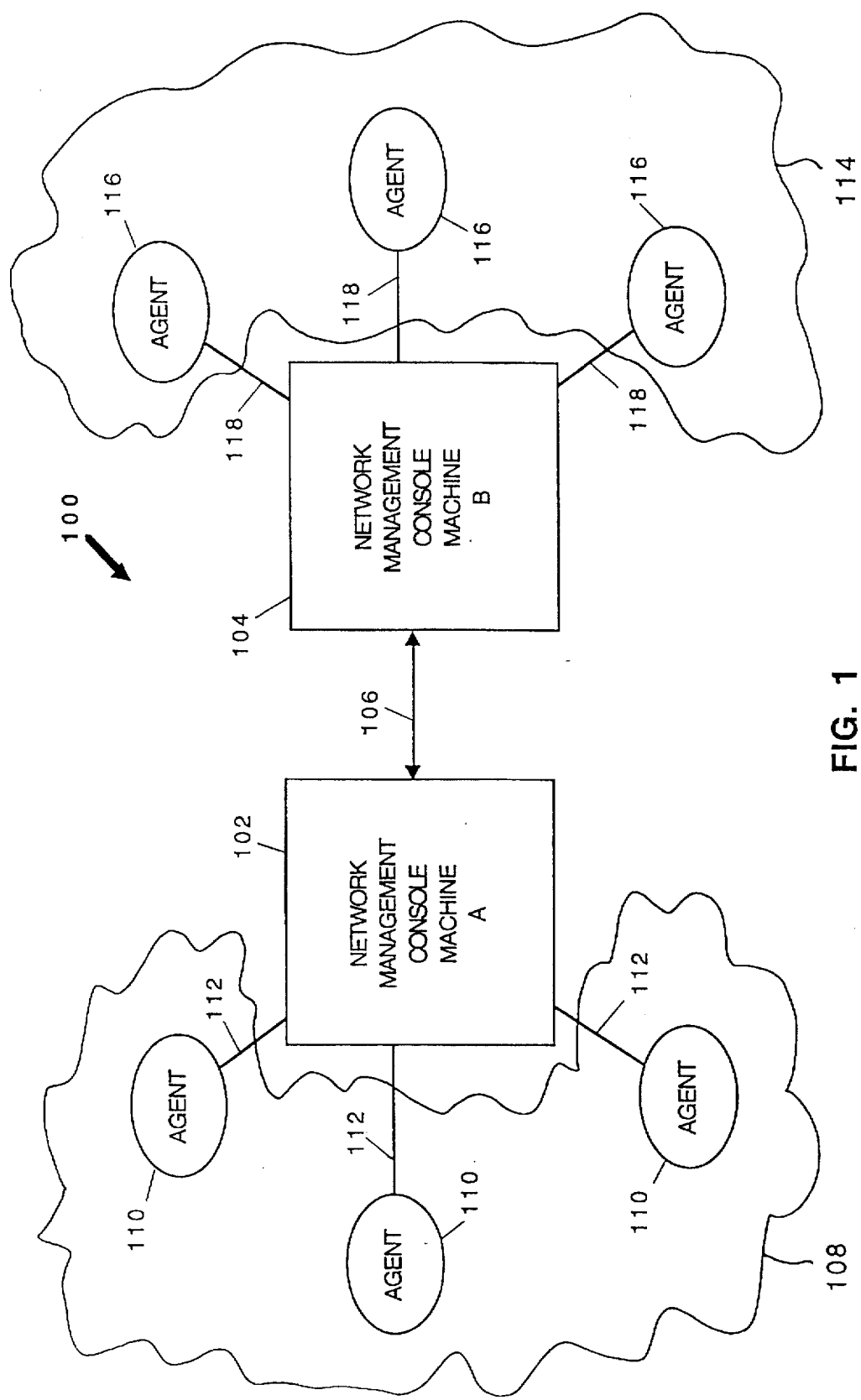
FIG. 1 is a block diagram of a network management system according to the invention.

Embodiments of the invention are discussed below with reference to FIGS. 1-10. However, those skilled in the art will readily appreciate that the detailed description given herein with respect to these figures is for explanatory purposes as the invention extends beyond these limited embodiments.

The present invention provides techniques for sharing information between network managers. Namely, the invention enables network managers to cooperate with one another so as to share important network information between network managers. More particularly, the invention operates to share information about certain changes in the state of critical network devices or changes in selected aspects of network topology between multiple network management stations. In the preferred embodiment, the important network information is event and topology information. By sharing such important network information, the network management performed by the distributed network managers can inform site managers not only of local network conditions but also about network conditions on other remote networks. As a result, network management is facilitated because site managers are able to take corrective action to improve network performance by taking into consideration important network information about remote networks which impact performance of the local network. Global or central management is also facilitated by the invention in an efficient and flexible manner because distributed network managers can be configured in numerous ways with ease.

A network manager refers to an application program which executes on a computer to manage a network. The computer executing the application program is referred to as a network management console machine. A site manager is an end-user who monitors the network via a display screen associated with the network management console machine. Hence, the network management console machine provides information to the site manager so that the site manager is able to take corrective action when necessary to improve operation of the network.

In accordance with the invention, different network management console machines are able to share network management information such that a site manager who primarily manages a local network can monitor or manage some or all of other remote networks. A receiving station is a network management console machine with a receiver process executing thereon. A sending station is a network management console machine with a sender process executing thereon. A network management console machine may function as both a sending station and a receiving station, or as only a sending station, or as only a receiving station.

A network management system in accordance with the invention includes at least one sending station and at least one receiving station. The particular distribution of the sender and receiver processes on the network management console machines depends on the desired network management configuration. Due to the flexibility of the invention, many network management configurations are possible, including a peer-to-peer relationship, a periphery-to-center relationship, and a center-to-periphery relationship.

In the peer-to-peer configuration, the network management console machines both send and receive event and topology information to each other. In this configuration, each network management console machine includes both a sender process and a receiver process, and thus functions as both a receiving and sending station.

An example of the peer-to-peer configuration is as follows. Company XYZ has separate network management (NM) console machines to manage regional networks. A network management station in San Francisco is responsible for managing a west coast region and a network management station in New York is responsible for managing an east coast region. The network administrator in New York wants to know about all changes to XYZ's backbone network (routers, WAN link) and critical servers (financial database server) in the west coast region. Events are filtered by a sender process on the San Francisco machine on the basis of host name (selecting the servers) and component type (selecting the routers) and forwarded to the NM console machine in New York. The relevant elements reside in a view on the San Francisco machine called "WestNet." The receiver process on the New York machine will place forwarded topology information under a view also called "WestNet" on the New York machine. The network management station in San Francisco also wants to receive this type of information from the NM console machine in New York. A receiver process on the San Francisco machine places forwarded topology information under a view called "EastNet," mirroring the view name on the New York machine.

In the periphery-to-center configuration, the flow of event and topology information is from distributed network management console machines to a central management console machine. For example, an organization may have multiple network management console machines responsible for regional components of its large network while also having a central network management console machine that needs to display and monitor the global network topology and the state of critical devices. The flow of information, in this configuration, is one-directional, from the regional management console machines to the central management console machine. In this configuration, the sender process need only be installed on the regional network management console machines while the receiver process only needs to run on the central network management console machine.

A variation on the periphery-to-center configuration is also available wherein regional network management console machines have management responsibility for a type of network link (for example, X.25, Frame Relay, ISDN) or type of network device (routers, database servers, T1 links) for the large network. Here, each network management console machine receives topology and event information from other network management console machines about devices of a particular type that it is responsible for, in addition to managing its own regional network. In this configuration, the network management console machines function as the "center" only for a particular type network link or type of network device. Both the sender and receiver processes are needed on each network management console machine in this configuration. The sender process is required to forward information that pertains to the types of devices the other network management console machines are interested in. The receiver process is needed in order to function as a receiving station to receive information about the particular device types the local network management console machine is managing for the large network.

In the center-to-periphery configuration, topology changes and events are propagated from one or more central network management console machines to distributed network management console machines in order to off-load responsibility for management of particular regions, type of network, or type of device. In this configuration, the central network management console machine runs the sender process but not the receiver process, and the peripheral management console machines run the receiver process but not the sender process.

In the embodiments of the invention discussed in detail below, the network management systems are capable of forwarding three types of information between the network management stations. The first type of information is network management (NM) events (hereafter NM events or events). NM events are generated by agents in response to NM event requests from network managers when conditions specified by the event requests are satisfied. For example, an agent could generate an event when a device associated with the agent becomes unreachable. An agent is a process that collects data from the managed object and reports it to the manager in the form or responses or generation of events/ traps. The second type of information is a trap. A trap is an unsolicited event (i.e., an event not generated in response to NM event requests). An example of a trap is a Simple Network Management Protocol (SNMP) linkDown trap. A linkDown trap is an unsolicited message sent to the manager by the agent and identifies the state of a physical or logical communication link/interface as down. The third type of information is a NM database trap. A NM database trap is generated when a change to a network management database is made. For example, NM database traps occur when adding a new element to the database or when some attributes of an element change or when an element is deleted.

FIG. 1 is a block diagram of a network management system 100 according to the invention. The network management system 100 includes a network management console machine A 102 and a network management console machine B 104. The network management console machines A and B 102, 104 are interconnected by a communication link 106. Each of the network management console machines A and B 102, 104 manages a separate portion of a large overall network (i.e., networks 108 and 114 respectively). According to the invention, certain network management information is shared between the network management console machines 102 and 104 so that management of the overall network can be done more efficiently and effectively.

The network management console machine A 102 manages a network 108. The network 108 includes numerous agents 10 which are coupled to the network management console machine A 102 via links 112. The agents 110 receive event requests from the network management console machine A 102 over the links 112 and then provide responses back to the network management console machine A 102 over the links 112.

The network management console machine B 104 manages a network 114. The network 114 includes agents 116 which are coupled to the network management console machine B 104 via links 118. The agents 116 receive event requests from the network management console machine B 104 over the links 118 and then provide responses back to the network management console machine B 104 over the links 118.

The large overall network includes the networks 108 and 114. The networks 108 and 114 each contains numerous network elements and perhaps also subnets of network elements. The network elements include such elements as routers, WAN link, servers, hubs, T1 links. The division of the large overall network into the networks 108 and 114 is common due to the ever increasing size of networks within large corporations or other businesses. Typically, the division of the network is made on the basis of geographical location or type. As an example, a large corporation might divide its large nationwide network into an east coast network and a west coast network so as to make management of the overall network practical and more efficient because as a whole the network is too large to be effectively centrally managed.

Figure 2:
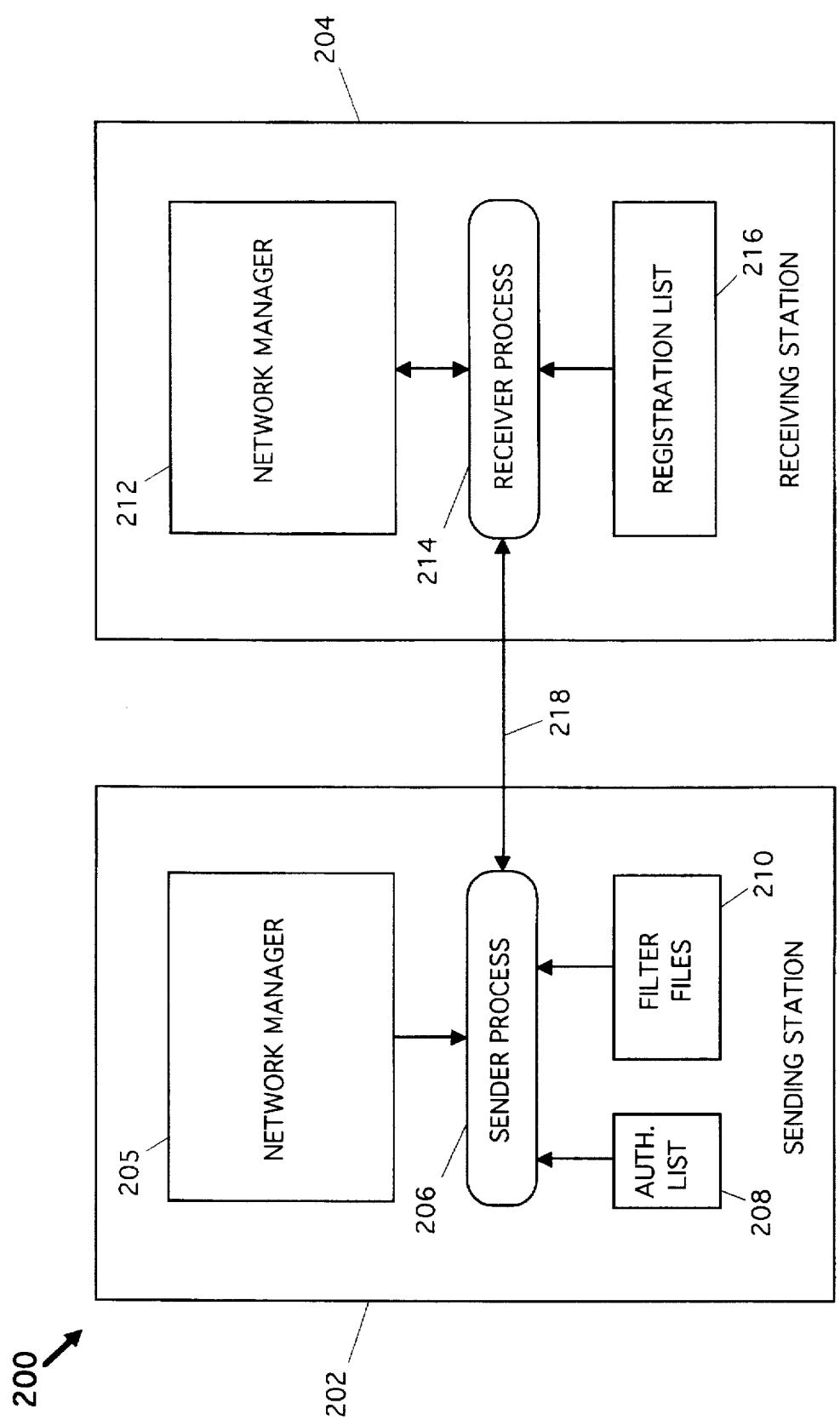
FIG. 2 is a block diagram of a network management system according to a basic embodiment of the invention.

FIG. 2 is a block diagram of a network management system 200 according to a basic embodiment of the invention. The network management system 200 includes a sending station 202 and a receiving station 204. The sending station 202 and the receiving station 204 are network management console machines. More particularly, the network management console machines are computer systems that execute network management programs to manage a network in accordance with the invention. The sending station 202 manages a first network and corresponds to the network management console machine A 102 shown in FIG. 1, and the receiving station 204 manages a second network and corresponds to the network management console machine B 104 shown in FIG. 1. The sending station 202 operates to send certain shared network management information to the receiving station 204. However, it should be understood that, in general, the network management console machines are capable of operating as both a sending station and a receiving station simultaneously. The sending station 202 and the receiving station 204 may, but need not, be part of the particular network they manage.

The sending station 202 includes a network manager 205, a sender process 206, an authorization list 208 and filter files 210. The network manager 205 is a conventional network manager for a network but provides no ability to exchange information with other like network managers. The sender process 206, the authorization list 208 and the filter files 210 are all novel and together operate to enable the sending station to exchange information with the receiving station.

The sender process 206 registers with the network manager 205 so as to receive local network management information from the network being managed by the sending station 202. The local network management information is produced by the network manager 205 in accordance with its management of a network (e.g., network 108).

The sending process 206 operates to forward certain of the network management information (e.g., events and topology information) to the appropriate receiving stations which have requested such information and are authorized to receive that information. The authorization list 208 contains information identifying those receiving stations which are authorized to receive the network management information from the sender process 206. The filter files 210 contain data identifying which of the network management information (e.g., events and topology information) received at the sender process 206 by the network manager 205 is to be forwarded by the sender process 206 to the appropriate receiving stations. Here, the appropriate receiving station is assumed to be the receiving station 204. The sender process 206 is then able to filter the network management information (e.g., events and topology information) in accordance with the filter data contained in one of the filter tables 210. After the filtering operation, the sender process 206 sends to the receiving station 204 only the portion of the network management data remaining after the filtering operation. Hence, only the information desired by the receiving station 204 is forwarded to the receiving station 204. Thus, distributed network managers can share network management information only to the extent needed and authorized, thus minimizing network traffic and providing some security for the network management information.

The receiving station 204 includes a network manager 212, a receiver process 214, and a registration list 216. The network manager 212 is the same as the network manager 205 (a conventional network manager for a network but provides no ability to exchange information with other like network managers), but operates differently as a receiving station than as a sending station 202. The receiver process 214 receives registration information from the registration list 216. The registration information specifies the appropriate event forwarding criteria (i.e., filter file) to be used by the sender process 206 as well as the sending stations to which the receiving station 204 is to register to receive the shared network management information. The receiver process 214 then initiates connection with the sender process 206 of the sending station 202 via a communication link 218. The sender process 206 verifies the authorization of the receiving station 204 using the authorization list 208. Thereafter, as the sender process 206 receives network management information from the network manager 205, the sender process 206 filters and forwards the network management information over the communication link 218 to the receiver process 214 as discussed above. The receiver process 214 then in turns supplies the network management information to the network manager 212 so that the network manager 212 can utilize the additional network management information from the sending station 202 to at least partially provide management or monitoring of the network associated with the sending station 202. The network manager 212 still manages the local network associated with the receiving station 204 (e.g., network 114).

The data transfer occurring over the communication link 218 can be performed using a connection-oriented protocol such as TCP/IP or connectionless protocol such as UDP, though TCP/IP is preferable due to its guaranteed delivery.

Each of the network managers 205, 212 is preferably a SunNet Manager (version 2.2.2 or later) running on Solaris 2.x or Solaris 1.1 operating system, both the SunNet Manager and Solaris are available from Sun Microsystems, Inc. The SunNet Manager is described in detail in SunNet Manager Reference Guide, by Sun Microsystems, Inc. 1994 and SunNet Manager Programmer's Guide, by Sun Microsystems, Inc. 1994, both of which is hereby incorporated by reference. Although the network managers 205, 212 are preferably conventional, according to the invention, the network managers 205, 212 operate in new ways, particularly with respect to interaction with the sender process 206 and the receiver process 214

Figure 3:
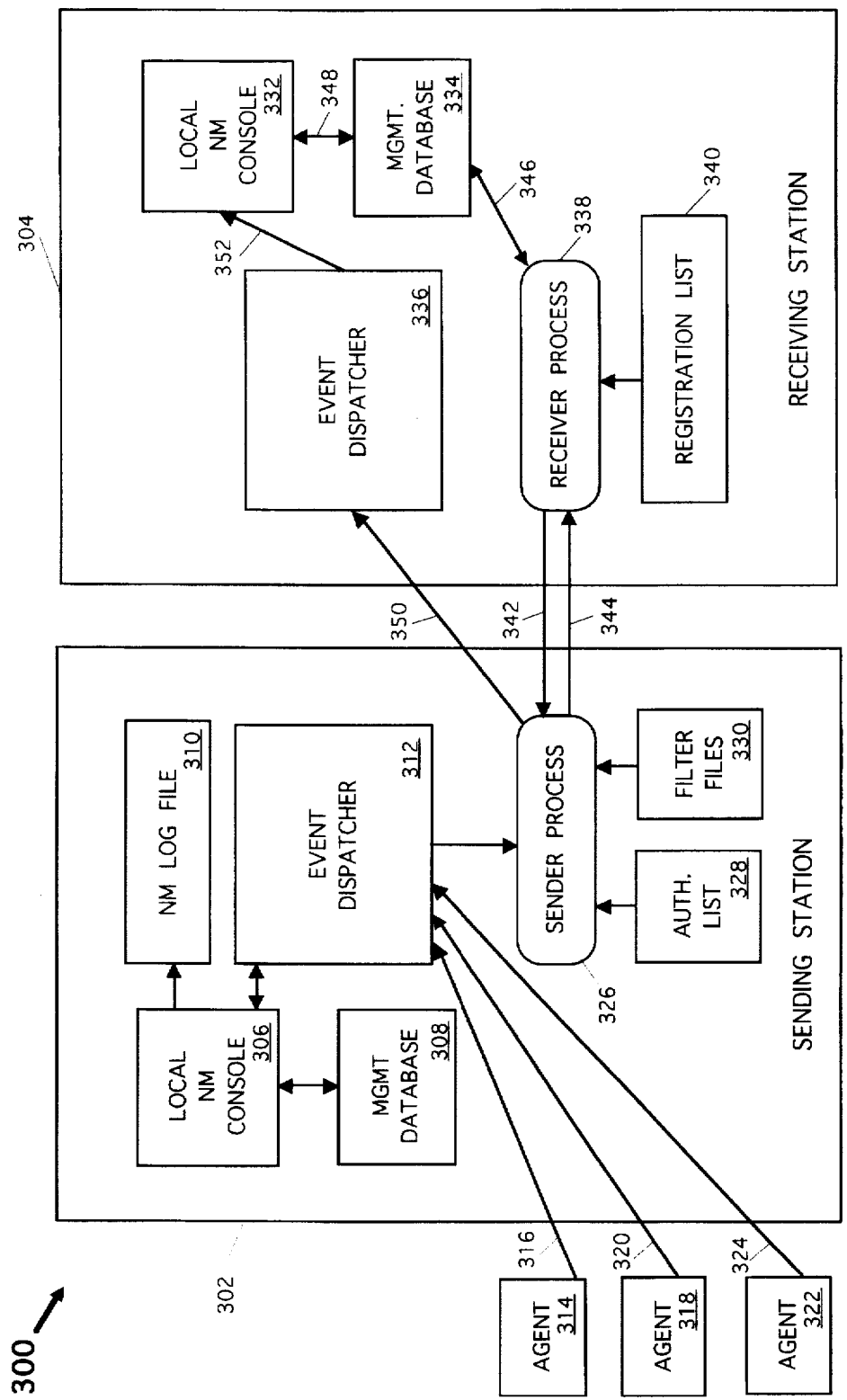
FIG. 3 is a detailed block diagram of a network management system in accordance with an embodiment of the invention.

FIG. 3 is a detailed block diagram of a network management system 300 in accordance with an embodiment of the invention. The network management system 300 includes a sending station 302 and a receiving station 304. The sending station 302 includes a local network management (NM) console 306, a management database 308, a NM log file 310, and an event dispatcher 312. The event dispatcher 312 receives event and traps from agent 314 over link 316, from agent 318 over link 320, and from agent 322 over link 324. The agents 314, 318 and 322 are used to monitor network elements of a network (not shown). The local network management (NM) console 306, the management database 308, the NM log file 310, and the event dispatcher 312 form a local NM system such as provided by a SunNet Manager console. To implement the sharing of network management information in accordance with the invention, the sending station 302 further includes a sender process 326, an authorization list 328 and filter files 330.

The receiving station 304 includes a local NM console 332, a management database 334, and an event dispatcher 336. The local network management (NM) console 332, the management database 334, and the event dispatcher 312 form a local NM system such as provided by a SunNet Manager console. To implement the sharing of network management information in accordance with the invention, the receiving station 304 further includes a receiver process 338 and a registration list 340.

When the receiving station 304 desires to receive information from the sending station 302, the registration list 340 is modified to contain information identifying the particular sending station from which network management information desired. The registration list 340 preferable identifies a host machine (i.e., sending station), filter file, and database. Hence, the registration information contained in the registration list 340 specifies the particular database involved when sending stations have multiple databases to choose from, the appropriate event forwarding criteria (i.e., filter file) to be used by the sender process, and the sending stations to which a receiving station is to register. It is assumed here that the receiving station 304 desires network management information from the sending station 302.

Once the receiver process 338 is initiated at the receiving station 304, the receiver process 338 requests connection to the sender process 326 of the sending station 302 using a connection request 342. Upon receiving the connection request, the sender process 326 then uses the authorization list 328 to determine whether the receiving station 304 (or the receiver process 338) is authorized to receive network management information from the sender process 326. The receiver process 338 is able to successfully register with the sender process 326 and access a given local database, only if that receiving station 304 is authorized to register with the sender process 326 and access the specified database. The authorization list 328 is used to determine whether the receiver process 338 is so authorized. Hence, by using the authorization list 328, unauthorized eavesdropping can be prevented. For performance reasons, it is preferable that a separate child sender process be spawned for each receiving station that registers with the sending station 302 and that a separate child receiver process be spawned for each sending station that the receiving station 304 desires to receive network management data from.

If the receiving station 304 is authorized, the sender process 326 registers with the event dispatcher 312 so as to receive all the network management information that the event dispatcher 312 receives due to local network management at the sending station. Here, the network management information includes events and traps from the agents 314, 318 and 322 as well as database traps from the management database 308.

The sender process 326 thereafter filters the network management information (e.g., event and traps) received from the event dispatcher 312 using a particular one of the filter files 330 as identified by the receiver process 338 during connection. The filtering operation discourages unnecessary forwarding of network management information. The network management information remaining after the filtering is referred to as filtered data. The filtered data can be grouped into two classes of data, namely, database traps and non-database traps and events. The database traps are forwarded to the receiver process 338 using a message 344.

The receiver process 338 then supplies the database traps to the management database 334 via a link 346. The management database 334 can then be modified in accordance with the database trap forwarded by the sender process 326. Thereafter, the local NM console 332 can be updated in accordance with the updates to the management database 334 using link 348. Typically, the local NM console 332 will update its view based on the changes to the management database 334. The non-database traps and events are forwarded by the sender process 326 to the event dispatcher 336 directly using a message 350. The event dispatcher 336 can then update the local NM console 332 over link 352.

Preferably, as database (topology) traps are received from the sender process 326, the receiver process 338 uses the database Application Programming Interface (API) of the local NM console 332 to update the local database 334 to reflect the topology information received from the sending station. The updating of the database 334 is preferably achieved as follows. When the receiver process 338 receives a database (topology) trap from the sender process 326, the receiver process 338 reads the local database 334 to determine if the element associated with the database trap already exists. If the element does not exist in the local database 334, then it is added to the local database 334. If an element already exists in the local database 334, the receiver process 338 determines whether the forwarded features of the element match those already attributed to the element. If the element's characteristics in the local database 334 already match the features reported in the database trap, the database trap is ignored. If the element's characteristics in the local database 334 differ from the forwarded characteristics, the event information in the local database 334 is changed to match the information forwarded from the sending process 326. Of course, the local database 334 can protect its elements (records) from being overwritten by configuring the sender process 326 such that it does not forward database traps for those elements not to be overwritten.

If view membership information is passed (such as with a Background type database trap), elements are added to the specified views if the views already exist in the local database 334. If the view is not yet present in the local database 334 at the receiving station 304, then the element can be added to a temporary holding area view. The system can also be configured so that the elements (components, views, etc.) that are added to the local database 334 can be left in the holding area view and even grouped in a different holding area view for each sending station.

On each receiving station, the local event dispatcher 336 preferably receives event-related traps from the sender process 326 of the sending station 302. The event dispatcher 336 then forwards the information to the local NM console 332. The event dispatcher 336 on the receiving station does not receive the NM database traps forwarded by the sender process because such topology information is sent to the receiver process 338 on the receiving station 304.

Preferably, the event dispatcher 312 receives events produced in response to event requests launched by the NM console 306. The event dispatcher 312 forwards the events to the sender process 326. The sender process reformats all traps and NM events into NM traps before forwarding them to the event dispatcher 336 on the receiving station 304. The event dispatcher 304 passes the traps to the local NM console 332. A NM event is converted into a trap before being sent to a receiving station because the local NM (SunNet) console at the receiving station will ignore NM events that it cannot match to one of its own event requests. The reformatting, for example, adds an indicator to the event information so that the receiving station can easily identify that the event or trap was forwarded from a sending station.

Each of the local NM consoles 306, 332 of the network management system 300 preferably has a graphical user interface (GUI) that displays on a display screen. The GUI enables an end-user to configure operations of the network management system 300. For example, an end-user preferably modifies the registration list 340 using a GUI.

Figure 4A:
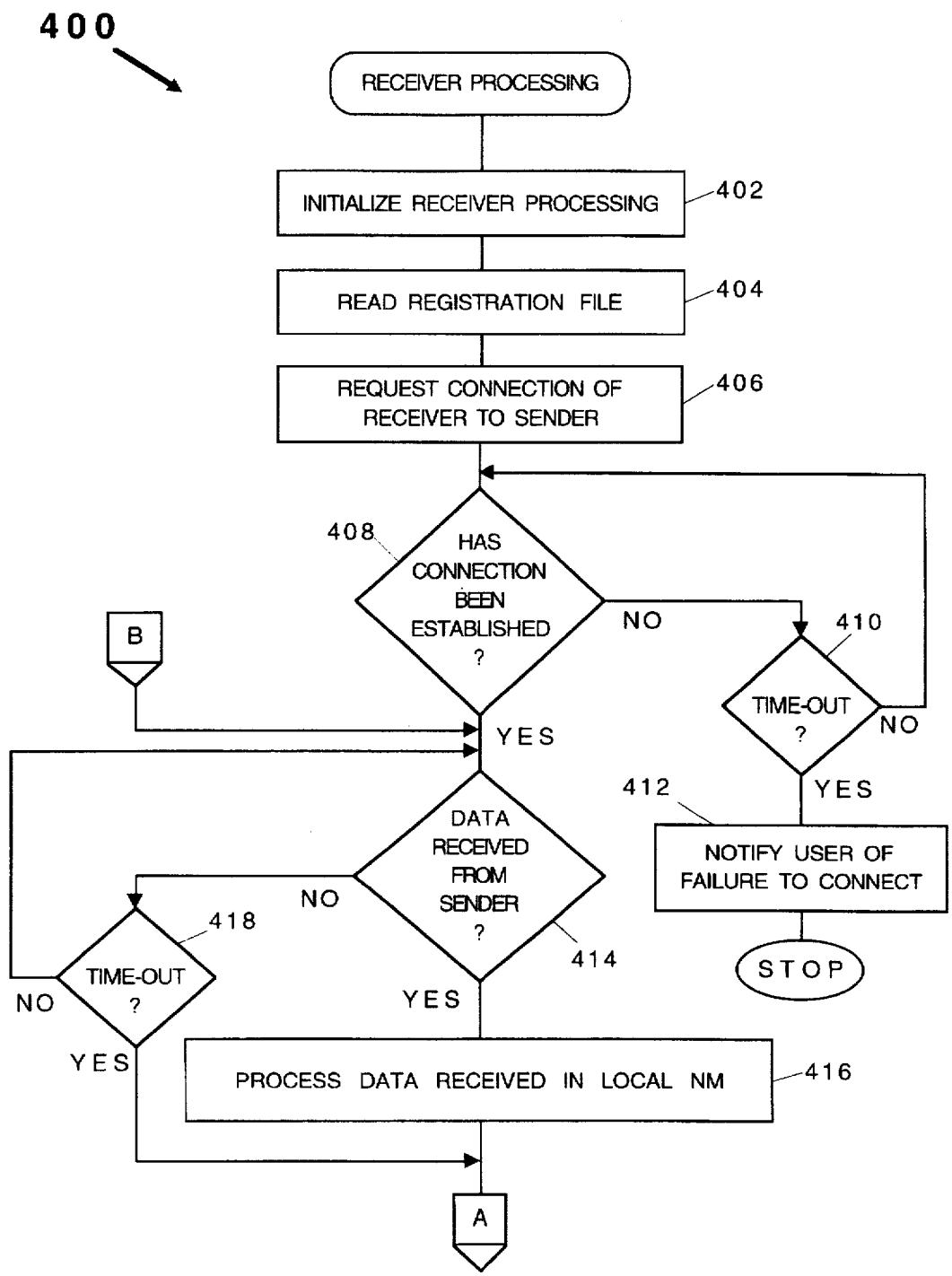
FIGS. 4A and 4B are flow diagrams illustrating receiver processing in accordance with an embodiment of the invention.
Figure 4B:
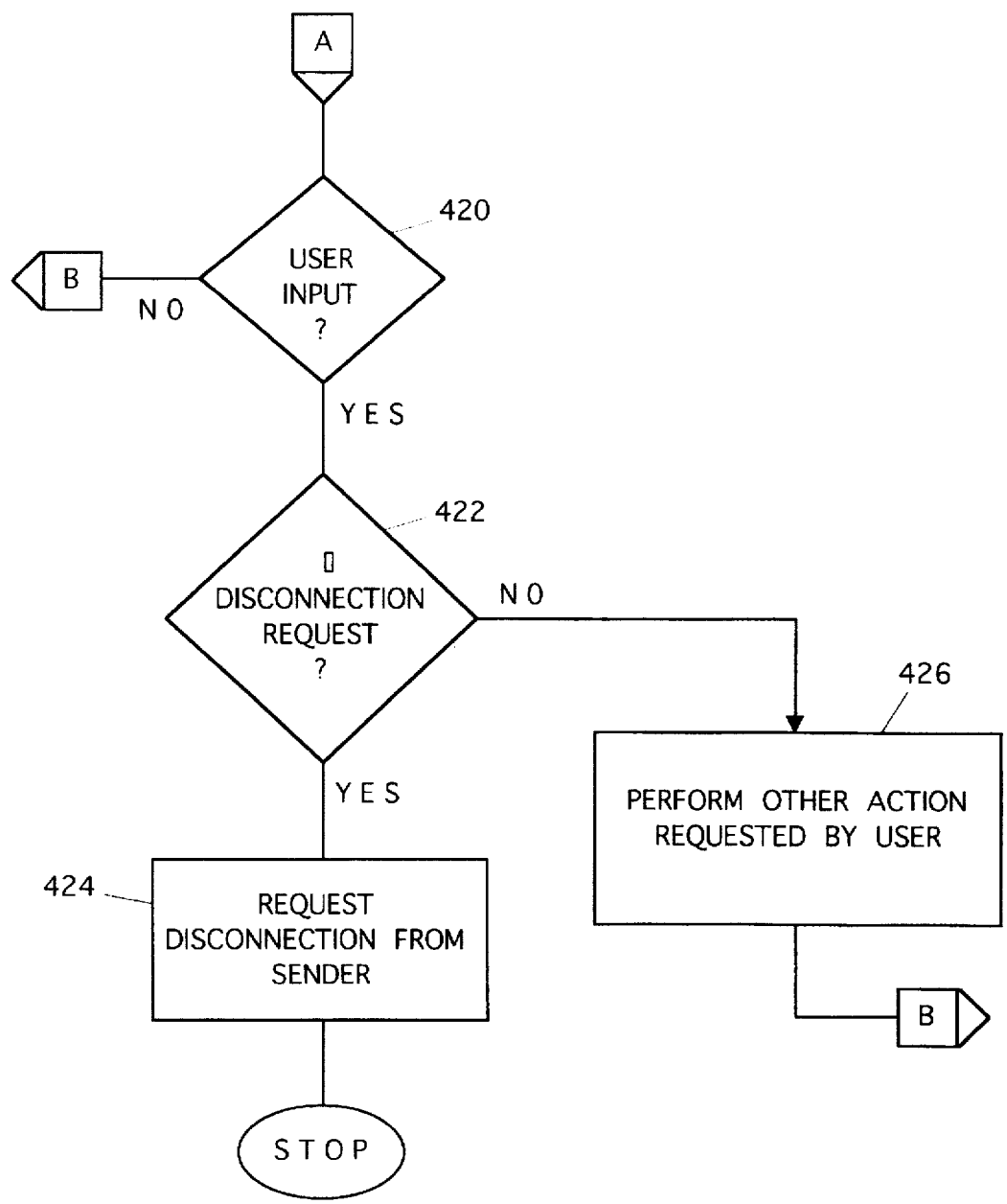

FIGS. 4A and 4B are flow diagrams illustrating receiver processing 400 in accordance with an embodiment of the invention. The receiver processing 400 is carried out by a receiver process such as the receiver process 214 of FIG. 2 or the receiver process 338 of FIG. 3.

The first operation of the receiver processing 400 is to initialize 402 the receiver process. Then, a registration file is read 404. Next, the receiver processing 400 requests 406 connection of the receiving station 204, 304 to the sending station 202, 302. More particularly, the connection requested 406 is of the receiver process to the sender process. Next, a decision 408 is made based on whether a connection has been established. If no connection has been established, a decision 410 determines whether a time-out has occurred. If a time-out has not yet occurred, the processing returns to the decision block 408. Otherwise, if a time-out has occurred, the user is notified 412 of the failure to connect and the receiver processing 400 ends.

On the other hand, when the decision block 408 determines that the connection has been established, a decision 414 is made based on whether data (i.e., network management information) has been received from the sender process. If data has been received, the data received is processed 416 in the local network manager 212, 332. If, on the other hand, data is not received from the sender process, a decision 418 is made based on whether a time-out has occurred. If a time-out has not yet occurred, the processing returns to repeat the decision block 414 and subsequent blocks. If the time-out has occurred, the receiver processing 400 skips block 416. Hence, following block 416 or following the decision block 418 in the case of a time-out, a decision 420 is made based on whether user input has been received. If no user input has been received, the receiver processing 400 returns to repeat the decision block 414 and subsequent blocks. On the other hand, if user input has been received, a decision block 422 determines whether the user has requested disconnection. If the user has requested disconnection, the receiver processing 400 requests 424 disconnection from the sender process 206, 326. Subsequent to the block 424, the receiver processing 400 ends. On the other hand, when the decision block 422 determines that disconnection has not been requested by the user, the receiver processing 400 performs 426 other actions as requested by the user. Examples of other actions requested by the user include manual synchronization and configuration of new connection. Following block 426, the receiver processing 400 repeats the decision block 414 and subsequent blocks.

Figure 5:
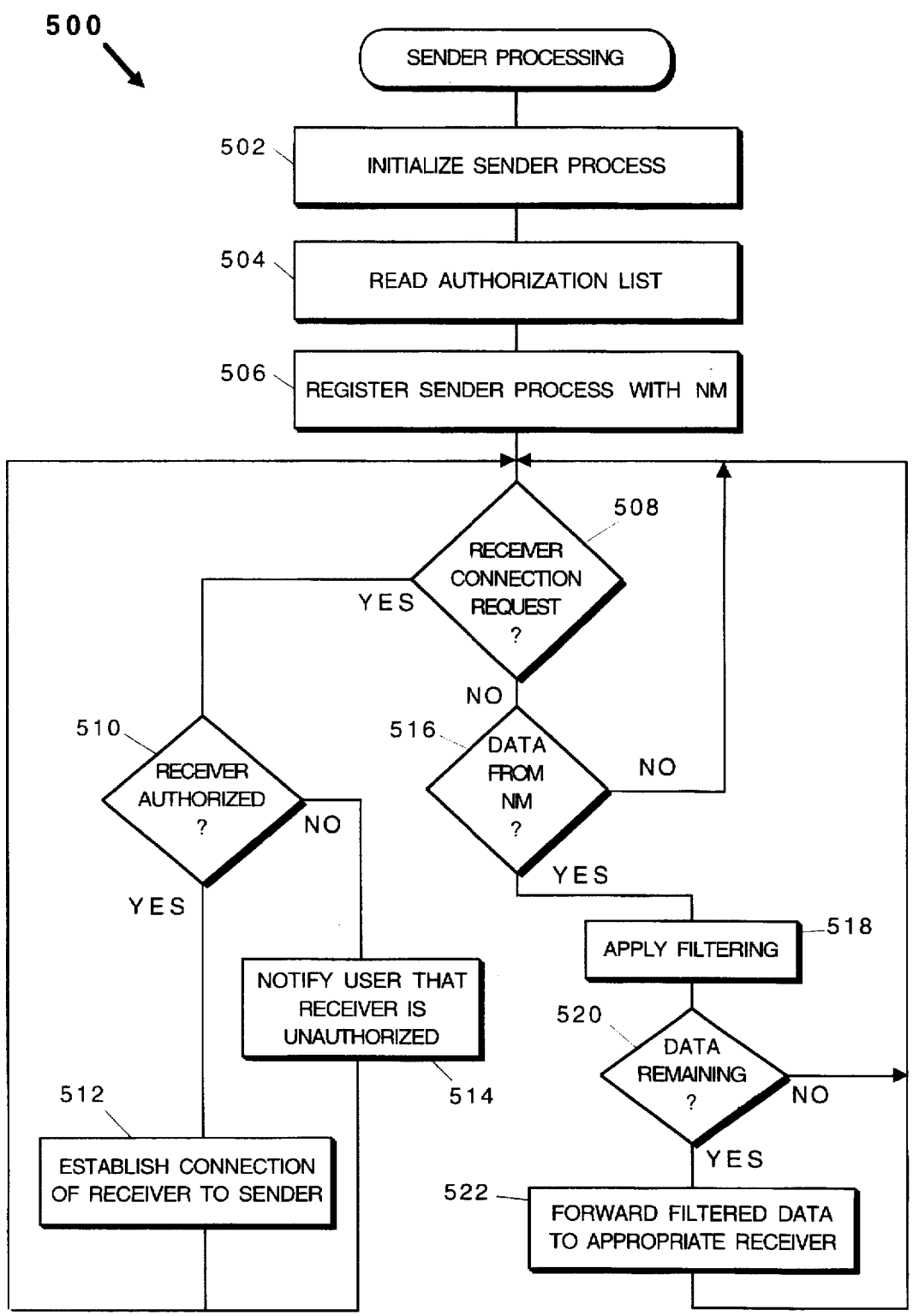
FIG. 5 is a flow diagram of sender processing in accordance with an embodiment of the invention.

FIG. 5 is a flow diagram of sender processing 500 in accordance with an embodiment of the invention. The sender processing 500 is carried out by a sender process such as the sender process 206 of FIG. 2 or the sender process 326 of FIG. 3.

The sender processing 500 is initiated in response to the first connection request from a receiving station. The sender processing 500 first initializes 502 the sender process. During initialization, various internal data structures and data states are initialized. Next, the sender processing 500 reads 504 the authorization list 208, 328. The sender processing 500 then registers 506 the sender process with the network manager 205, 312 (event dispatcher). Next, a decision block 508 determines whether a connection request has been made by a receiver process. If a connection request has been received at the sender process, a decision block 510 determines whether the receiver process (or receiving station) is authorized to receive data from the sending station. The decision block 510 determines whether the receiver process is authorized using the authorization list 208, 328.

If the receiver process is authorized, connection of the receiver process to the sender process is established 512. When the connection is requested, the receiver process preferably also passes the sender process a database name and the filter file name. The database name selects the particular database from which to forward database traps when there are multiple databases at the sending station. The filter file name specifies the filter file that contains the filter table with the desired filter criteria. Otherwise, if the receiver process is not authorized, the user is notified 514 that the receiver process is unauthorized. The connection request will fail if the receiver process passes the name of a non-existent filter file or a database that the receiver process is not authorized to access the selected database. Following blocks 512 or 514 in the case of a receiver connection request, the sender processing 500 returns to repeat the decision block 508 and subsequent blocks.

On the other hand, when a connection request has not been received, the decision block 508 causes the sender processing 500 to proceed to decision block 516. The decision block 516 determines whether data has been received from the local network manager 205, 312 (event dispatcher). If no data has been received from the network manager 205, 312, the sender processing 500 returns to repeat the decision block 508 and subsequent blocks. Otherwise, when data has been received from the network manager 205, 312, the sender processing 500 applies 518 filtering. The filtering operation is discussed in more detail below with reference to FIG. 6. Generally speaking, the filtering operation filters the data (i.e., network management information) so that only the data requested by the receiver process (receiving station) remains after the filtering operation. Thereafter, a decision block 520 determines whether there is data remaining after the filtering has been applied 518. If there is no data remaining, then there is no data to forward to the receiver process; hence, the sender processing 500 returns to repeat the decision block 508 and subsequent blocks. When there is data remaining after the filtering is applied 518, the filtered data is forwarded 522 to the appropriate receiver process. The appropriate receiver process is the receiver process that has requested the data be transmitted thereto. Then, following block 522, the sender processing 500 returns to repeat decision block 508 and subsequent blocks. When all the receiver processes that have been registered with the sender process disconnect, then the sender process unregisters from the network manager 205, 312 (event dispatcher) and exits thereby ending the sender processing 500.

A receiving station can choose to register with multiple sending stations. Also, multiple receiver processes on various receiving stations can register with a sender process on a given sending station and the filter criteria can be configured separately for each receiving station. Preferably, for each pair sending and receiving stations, a dedicated pair of child processes (i.e., a child sender process and a child receiver process) are used to manage the processing.

Figure 6:
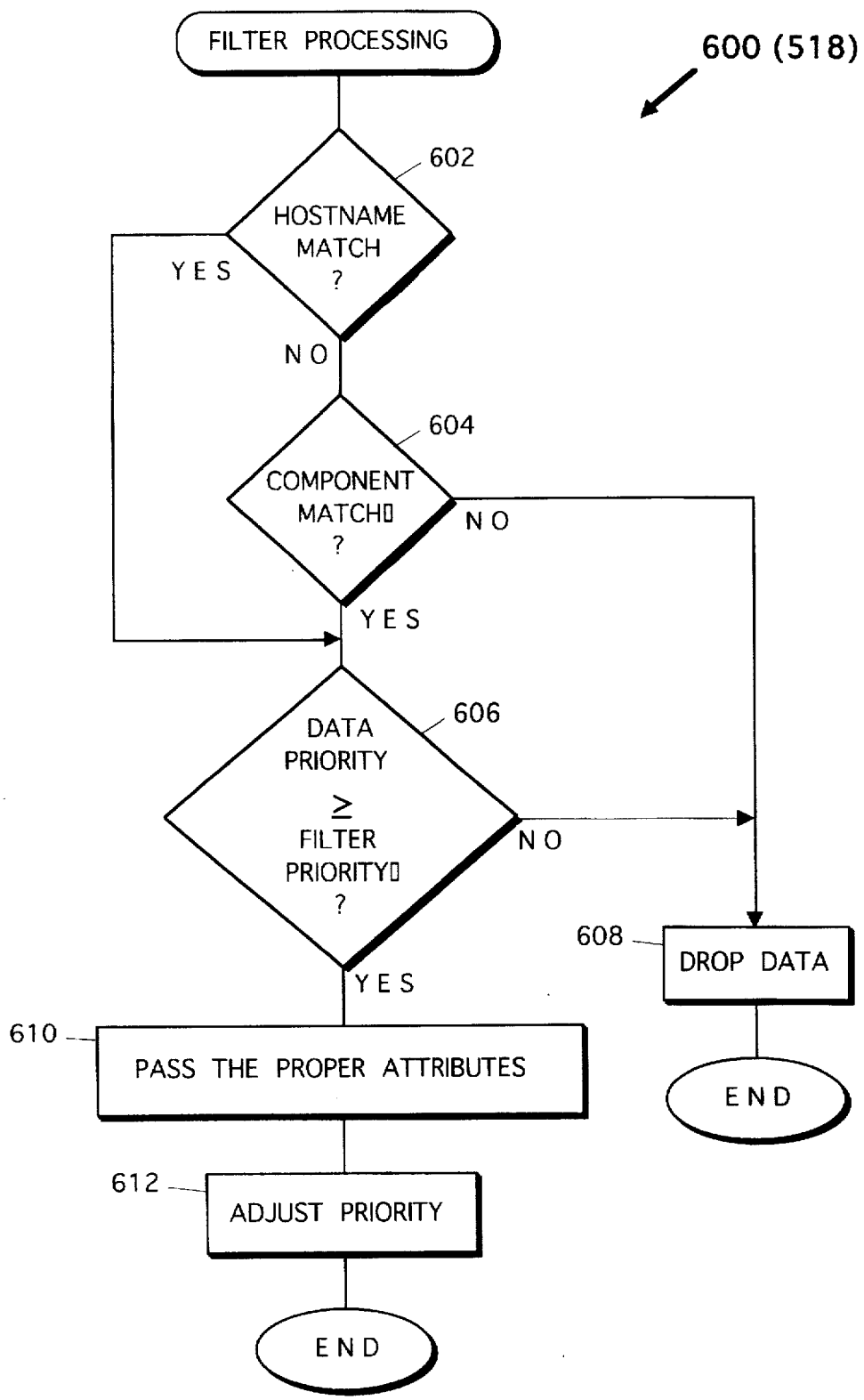
FIG. 6 is a flow diagram of filter processing in accordance with an embodiment of the invention.

FIG. 6 is a flow diagram of filter processing 600 in accordance with an embodiment of the invention. The filter processing 600 is the processing preferably carried out by block 518 in FIG. 5.

The filter processing 600 begins with a decision block 602 which determines whether the host name of the data received at the sender process (from the network manager 205 or the event dispatcher 312 thereof) matches the host name listed in a filter table residing in or identified by the filter files 210, 330. If not, a decision block 604 determines whether or not the component of the data received at the sender process matches the component listed in the filter table. Preferably, the filter table and/or filter file for a particular receiver process (receiving station) are selected by the receiver process when the connection request is accepted. If the decision block 604 determines that the component of the data received does not match the component in the filter table, the data received is dropped 608 and filter processing 600 ends.

On the other hand, following the decision block 602 when the host name matches or following the decision block 604 when the host name does not match but the component does match, a decision block 606 determines whether the priority level of the data received (data priority) is greater than or equal to a priority level identified in the filter table (filter priority level). Typically, the priority levels would be low, medium and high. If the data priority of the data received is less than the filter priority level, then the data is dropped 608 and the filter processing 600 ends. On the other hand, if the data priority exceeds or is equal to the filter priority level, the proper attributes are passed 610. The attributes to be passed are identified in the filter table. Thereafter, the priority level of the data received is optionally adjusted 612 in accordance with information identified in the filter table. It is preferable to adjust the priority of the data received to low priority because normally the shared network management information has a low priority regardless of the fact that the priority might have been high at its local network manager. Following block 612, the filter processing 600 ends.

To implement the filter processing 600, each filter table residing in or identified by the filter files 210, 330 preferably includes the following six fields.

1. Type—This determines the primary selection criterion for processing a trap or event. The type can be: hostname, component, or default. The type default filter is used if an event or trap does not match the type criterion of any of the other filters. If the type is hostname, this selection criterion is satisfied if the value of the name field matches the host name associated with the event or trap. If the type is component, this selection criterion is satisfied if the component type in the name field (for example, component.router) matches the component type associated with the event or trap.

2. Name—If the type is hostname, the name field value is either an IP address or the hostname of a glyph in the database. If the type is component, the name field value must be the name of a component type (for example, component.router), view type (for example, view.subnet, or bus type (for example, bus.rs232). 3. Priority—This field specifies the lowest priority event or trap that the filter will process. For example, if "low" is specified, then events of any priority will satisfy this criterion. The filter will be selected if the event or trap satisfies both the name field criterion and the priority field criterion.

4. New Priority—If a value is specified here, this is the priority of the trap when forwarded.

5. Action—This field specifies whether an event or trap selected by the filter should be either forwarded or ignored.

6. DB Template—This field specifies the file name of the database template that should be used in selecting information from the database when forwarding NM database traps.

The filter table (via the DB Template field) specifies the database template file to determine the topology information that should be forwarded for NM database traps that match the Name field of the filter table. Each filter in the filter table can specify a database template file used for elements that match the selection criteria of the filter. The database template files are only accessed in response to NM database traps because non-database traps or events do not cause the sender process to forward topology information to the remote receiver process. The database template files specify the information (e.g., agents, attributes, color, connections, and membership) to be passed or forwarded for each type of trap (i.e., add, create, change, delete, load and background.)

Preferably, the network manager 202 or the local NM console 306 generate six different types of NM database traps. These representative types of NM database traps are as follows:

1. Add—Generated when a new element is added to the database via, for example, the database Application Programmatic Interface (API).

2. Background—Generated when a background image is added to a view.

3. Create—Generated when a new element is created via the NM console.

4. Change—Generated when attributes of the element (such as the agents list or the screen coordinates) are changed.

5. Delete—Generated when an element is deleted from the database.

6. Load—Generated when a new management database is loaded.

When the sender process 326 receives NM database traps from the event dispatcher 312, the sender process 326 uses the filter file 330 specified for the receiving station 304 to determine which database template file to use in processing the database trap. The DB Template field in the filter table contains the database template file name. The database template file allows you to specify additional topology information that should be forwarded. Because the filter table allows you to specify different DB Template files in each filter, an end-user can use the filter selection criteria to specify different types of topology information to forward for different devices (by hostname or element type.

A representative DB Template file has the format shown in Table 1 below.

TABLE 1

Database Template File Format

| Trap Type | Keywords (one or more can be specified) |
|---|---|
| Add | membership, color, agents, attributes, connections, drop |
| Create | membership, color, agents, attributes, connections, drop |
| Change | membership, color, agents, attributes, connections, drop |
| Delete | drop |
| Load | membership, color, agents, attributes, connections, drop |
| Background | drop |

The keywords in the above table determine the forwarded content for each of these four trap types. The keywords have the following interpretation:

1. Membership—If specified, the view name and coordinates will be passes for each view the element belongs to.
2. Color—If specified, the element's RGB values are passed.
3. Agents—If specified, the name of each agent selected on the element's properties sheet is passed, and the proxy system name is also passed for each specified proxy agent.
4. Attributes—If specified, the entries for each attribute specified in a schema file for that element (e.g., IP address or contact name) are passed.
5. Connections—If specified, information about the simple connections to the element will be forwarded.
6. Drop—If specified, traps of this type will not be forwarded.

Preferably, a GUI is used to configure a sender and receiver processes of the network management system according to the invention. By using a GUI, the end-user is able to configure the information sharing provided by the invention with minimal effort. The GUI would allow the user to easily define the following: (i) the list of remote receiving stations authorized to register with the local sender process and the databases that the receiving stations are authorized to access, (ii) filter files and database templates that determine the event and topology information forwarded by the sender process, and (iii) the list of remote management stations the receiver process will attempt to register within the database instance and the filter file that it will request at the sending station.

Preferably, all traps directed to the receiver process are sent to the receiver's transient RPC number. The RPC number is provided to the sender process as part of the registration process. The basic format of the trap message is preferably a series of "attribute=value" pairs. For a trap of type "changed" generated against device "andrew" this would look like this:

```
coop_forwarded_by = lobsta
changed = andrew
type = component.ss1
IP_Address =
User =
Location =
Description =
SNMP_RdCommunity =
SNMP_WrCommunity =
SNMP_Vendor_Proxy =
SNMP_Timeout = 0
red = 100
green = 220
blue = 0
view = Home
Xpos = 160
Ypos = 240
X1pos = 0
Y1pos = 0
connected = lobsta
agent = hostif
agent = hostperf:andrew
```

These fields of the trap message could be analyzed as follow

The first field should be "coop_forwarded_by". Each sender process adds one of these lines at the head of each report. The value of this attribute should be the name of the local host forwarding the report. This is used by the receiver process to prevent message loops, as well as by users, to determine who originated each message.

The second field is the database trap type. The attribute name in this field is usually one of the following: changed, deleted, added, loaded, or created. The value is the name of the element that this trap is being generated for.

The next attribute is "type." The value of this attribute is the local NM (e.g., SunNet Manager) component type for the element as represented in the local database.

The next series of fields—in this example, the fields from IP_Address to SNMP_Timeout—are determined by the schema definition for the component type. These fields can be any set of attributes as determined by the schema.

The next three attributes specify the glyph color, in terms of red, green, and blue values. The range of values should be an integer from 0 to 255.

Next there is a list of the views to which the element belongs. These views are listed with one "view= viewname" pair for each view the element should be displayed in. Each "view=viewname" pair is to be followed by the position information (X and Y coordinates) that defines the position of that element within that view. The values Xlpos and Ylpos are only used for elements of type bus.ethernet.

The "connected" attribute indicates what elements this element has been connected to. These connections are "simple" connections, not manageable components.

Finally, a list of the element's agents is added to the end of the report. Each entry in this list is of the form: "agent=agentname:proxy". In such an entry agentname:proxy represents the name of the agent that has been enabled, followed by information defining which host should be used as a proxy system. If an agent is not a proxy agent, only the agent name is provided, with no colon(":") or proxy name.

Another feature of the invention concerns the synchronization of the databases at the sending station and the receiving station. When the sending station is forwarding network management information to the receiving station in the form of database traps concerning topology of the network being monitored by the sending station, it is desirable that the portion of the database of the receiving station be synchronized with the database of the sending station. If the databases are not synchronized, then a network administrator at the receiving station would visualize a view based on stale data. Also, traps for devices not in the database of the receiving station will be ignored, thus leading to incomplete monitoring of the remote network. The synchronization of the databases can be achieved whenever the network management system is started-up, or automatically as a user configures, or even manually whenever the site manager (network administrator) so requests. The synchronization provided by the invention is automatic once a request for synchronization is made by the receiving station. The synchronization operation automatically operates to synchronize the topology data contained in the database of the receiving station with the corresponding topology data contained in the database of the sending station.

Figure 7:
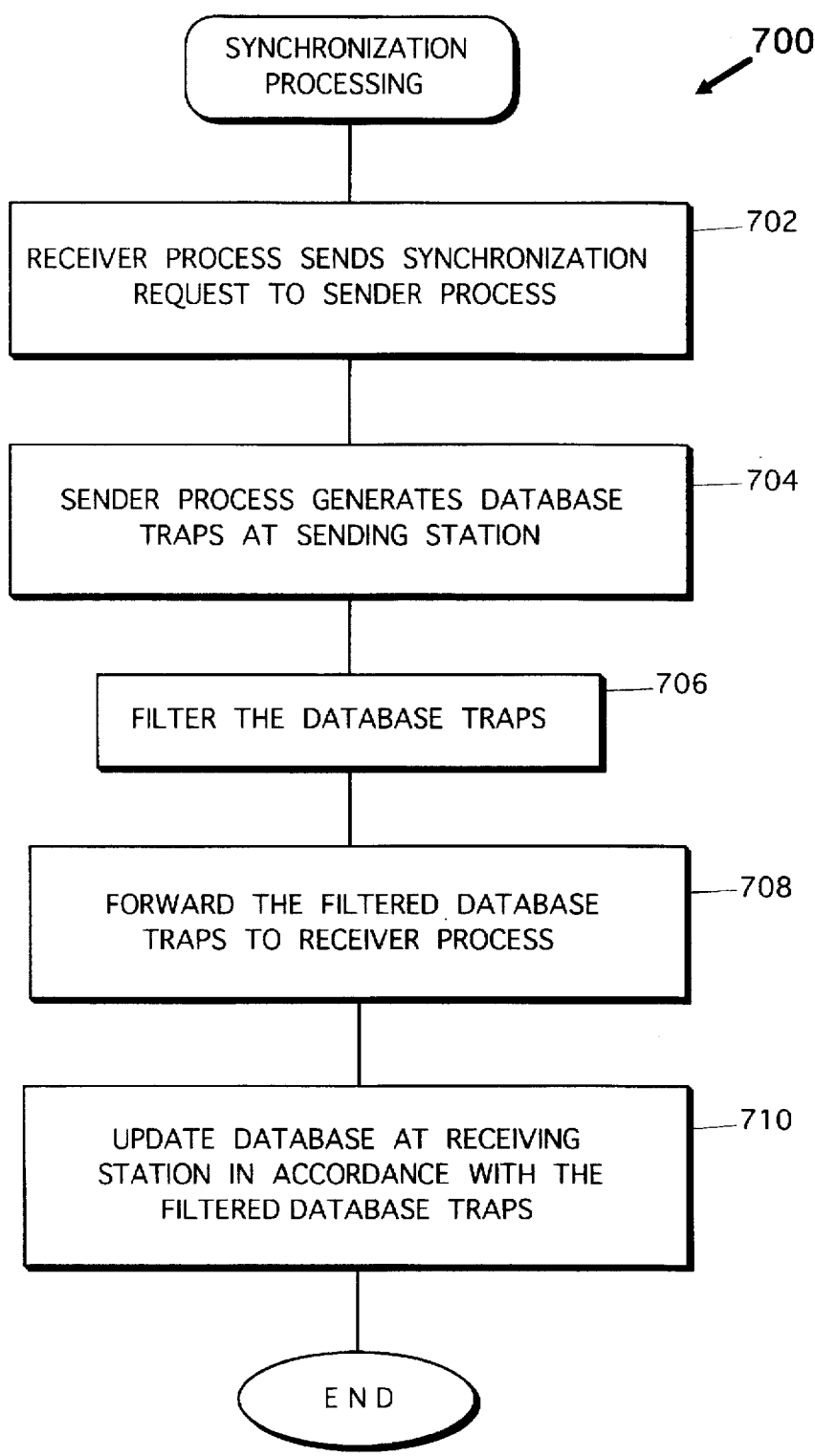
FIG. 7 illustrates a flow diagram of synchronization processing in accordance with an embodiment of the invention.

FIG. 7 illustrates a flow diagram of synchronization processing 700 in accordance with an embodiment of the invention. First, the receiver process 214, 338 sends a synchronization request to the sender process 206, 326. Then, in response to the synchronization request, the sender process 206, 326 generates 704 database traps at the sending station. Next, the database traps are filtered 706 at the sender process 206, 326. The filtering 706 corresponds to the database trap filtering (block 610) performed in accordance with the filter processing 600 shown in FIG. 6. Next, the filtered database traps are forwarded 708 to the receiver process 214, 338. Thereafter, the receiver process 338 causes the database at the receiving station 204, 304 to be updated 710 in accordance with the filtered database traps. The updating 710 in effect synchronizes the database at the receiving station 204, 304 with the database at the sending station 202, 302 to the extent permitted (via filtering) by the end-user.

Figure 8A:
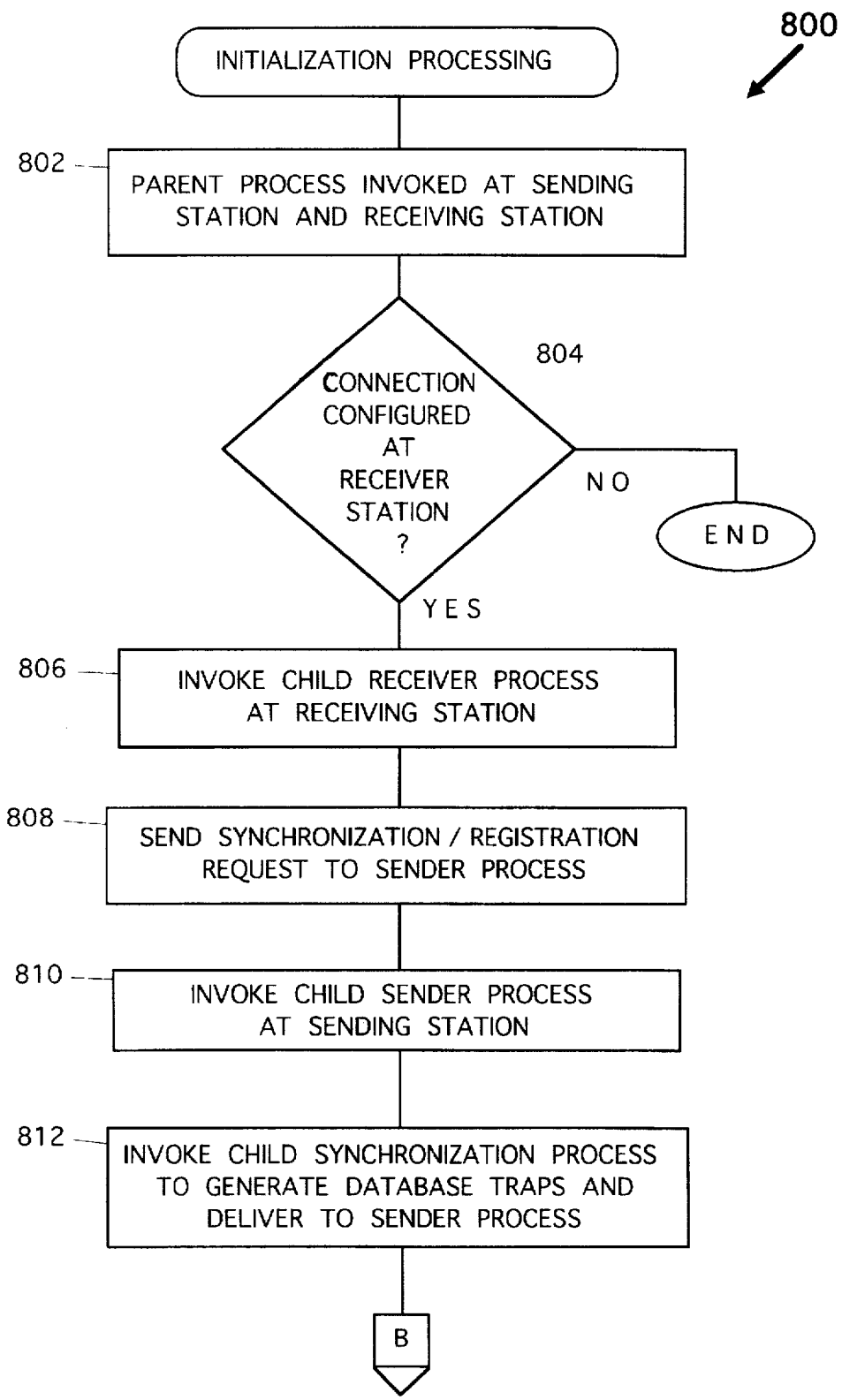
FIGS. 8A and 8B are flow diagrams of initialization processing according to an embodiment of the invention.
Figure 8B:
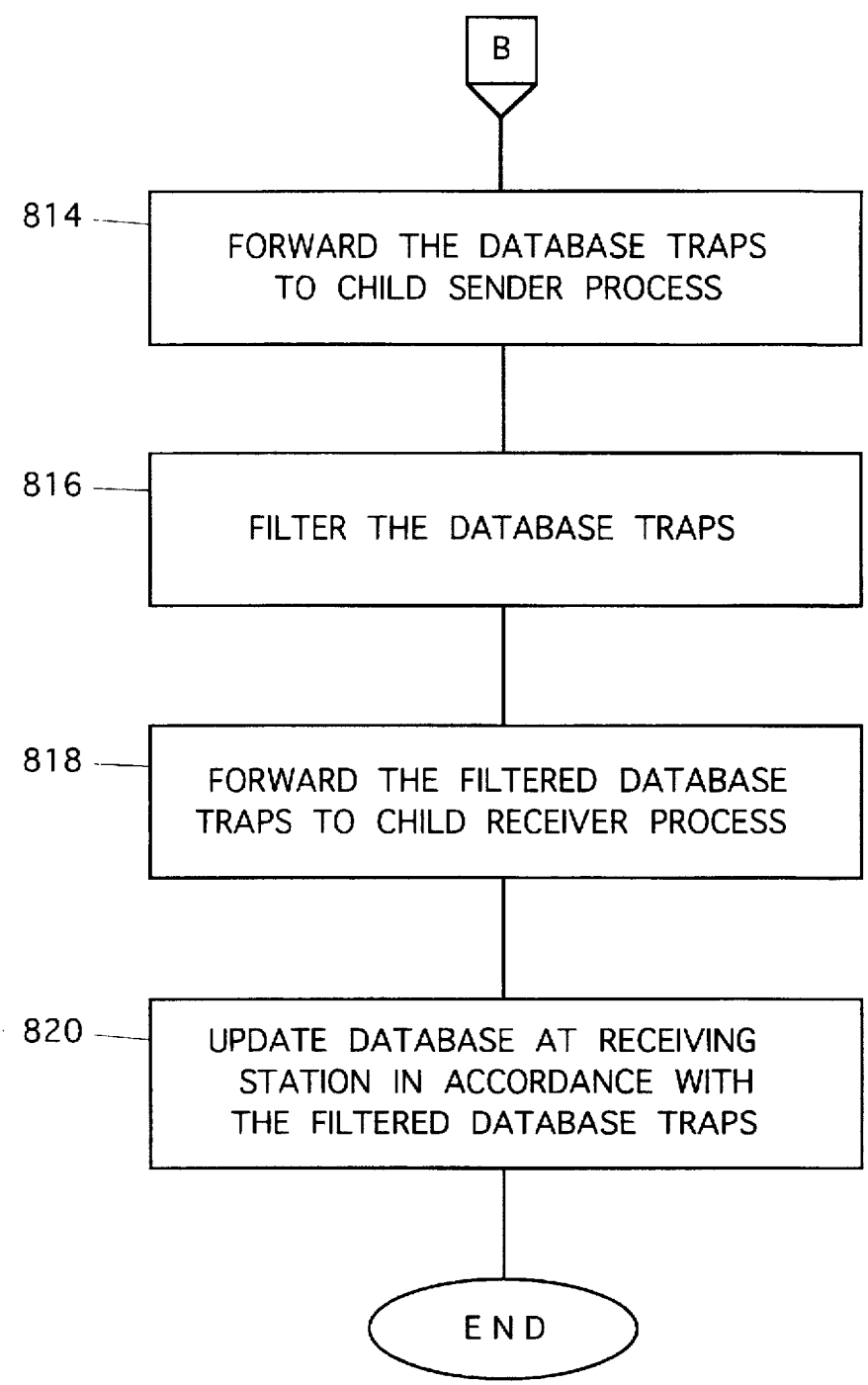

FIGS. 8A and 8B are flow diagrams of initialization processing 800 according to a more detailed embodiment of the invention. The initialization processing 800 synchronizes databases of the sending station and the receiving station upon initiation of the network management system. Because the initialization processing 800 is done upon initialization, the initialization processing 800 additionally includes operations performed by the initialization operation 402 in FIG. 4A and the initialization operation 502 in FIG. 5.

The first operation of the initialization processing 800 is to invoke 802 a parent process at the sending station and the receiving station. Next, a decision 804 is made based on whether the initialization sequence is configured to request a connection at start-up. If not, the initialization processing 800 ends because in this case a connection is not requested upon initialization. On the other hand, when the connection is initially requested at start-up, the initialization processing 800 performs other operations to carry out the connection as well as the synchronization operation. Namely, the initialization processing 800 invokes 806 a child receiver process at the receiving station 204, 304. Here, the receiver process 214, 338 spawns the child receiver process to interact with a particular sending station 202, 302. Next, the child receiver process sends 808 a synchronization/registration request to the sender process 206, 326. The synchronization/registration request includes a connection request as discussed above together with a request for initial synchronization.

In response to the synchronization/registration request, the sender process 206, 326 invokes 810 a child sender process at the sending station 202, 302. The child sender process is used to forward the filtered data through the child receiver process via the event dispatcher 312. By spawning child processes the sender process and receiver process effectively off loads processing tasks to the child processes such that they can manage incoming requests or connections and disconnections without being blocked by other processing operations.

Next, the sender process 206, 326 invokes 812 a child synchronization process to generate database traps and to deliver the database traps to the sender process. In order to generate the database traps needed at the receiving station, the sender process invokes 812 the child synchronization process which is a temporary process that reads through the entire database at the sending station 202, 302 and generates the database traps as it steps through the database. The child synchronization process then delivers the database traps to the sender process 206, 326 and then exits. Next, the sender process 206, 326 forwards 814 the database traps to the child sender process. At the child sender process, the database traps are filtered 816. The filtering performs the same operations as noted by block 610 in FIG. 6. After the database traps are filtered so that only the database traps the receiving station 204, 304 desires remain, then the filtered database traps are forwarded 818 to the child receiver process of the receiving station 204, 304. Thereafter, the database at the receiving station is updated 820 in accordance with the filtered database traps. The updating 820 is carried out as discussed above.

To provide accurate synchronization between two network management stations, it is preferable to uniquely identify the data which is being synchronized and what has been synchronized earlier. A property can be added to each of the databases to provide the identification of the data being synchronized. The property has a value which uniquely identifies each object in the database. Each component will have the property and the value of the property will preferably take the form of "Sender__hostname": filter__ filename: database__name".

Synchronization is always initiated by the receiver process. If the receiver process is currently synchronizing when another synchronization request is initiated (i.e., a manual synchronization request) toward the same connection, the current synchronization operation is preferably halted and a new synchronization process is started. The processing associated with halting the current synchronization operation and starting a new operation is as follows. First, the receiver process can tell the child receiver process to send a delete request to the sender process. The child receiver process then terminates itself. As a result of the delete request, the sender process terminates the child sender process. The receiver process then invokes a new child receiver process which deletes all the elements from the database at the receiving station having the properties for that connection. The new child receiver process then sends a synchronization request to the sender process. The sender process then invokes a new child sender process and a new child synchronization process. The new child synchronization process generates the database traps and delivers them to the new sender process which in turn forwards them to the child sender process. The child sender process then filters the database traps and forwards the filtered database traps to the new child receiver process. Finally, the new child receiver process will add the objects to the database at the receiving station with the appropriate value of the new property.

If the site is synchronizing daily with two other sites, the value of the property for an object (e.g., hostname X) preferably contains the sender's hostname with which the receiver synchronizes with first. Of course, the user can over-ride this option by manually deleting the object and re-synchronizing with the second site.

The receiver process operates to receive all the database traps from the sending station unless filtered out. After receiving the database traps this receiver process updates the database and the receiving station. With synchronization, the topology data stored in the database at the receiving station can be synchronized to the corresponding topology data stored in the database at the sending station. The filtering allows synchronization to take place for only certain types of database traps.

A graphical user interface (GUI) can be used to provide an end-user with a dialog box in which the user is able to select how and when the synchronization is to occur. For example, permission to delete an object from a database at the receiving station can be restricted to only those sites which are the source of the particular objects being deleted. Another example is that the user can select an option to synchronize at start-up which follows the processing described above with reference to FIGS. 8A and 8B. This type of synchronization initiation would occur on a normal start-up or after a crash of the system. The user can also select whether the synchronization of the databases shall occur automatically, and if so, how often (e.g., on a daily or weekly basis).

Figure 9:
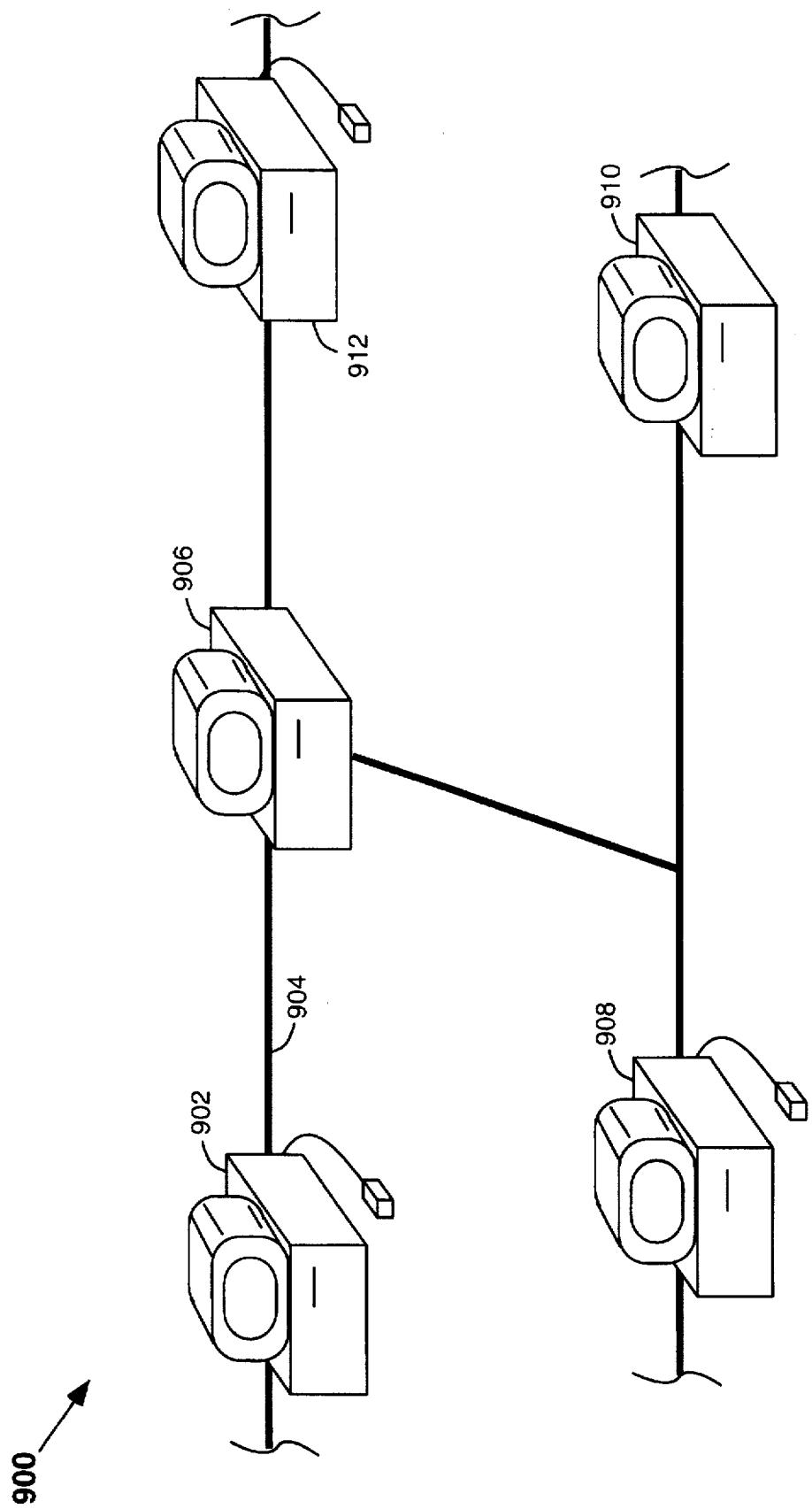
FIG. 9 is a diagram of a representative network arrangement according to the invention.

FIG. 9 is a diagram of a representative network arrangement 900 according to the invention. Usually, but not necessarily, the computer processes in accordance with the present invention and other computer processes are resident on one or more computers linked together by a network. The network may be the same network or a portion of the large overall network being managed by the network management system according to the invention. The network may take any suitable form. By way of example, the network arrangement 900 shown in FIG. 9 includes a first computer 902 which is coupled to a transmission line 904. The network arrangement 900 further includes a server, router or the like 906 in addition to other computers 908, 910, and 912 such that data and instructions can be passed among the networked computers. The design, construction and implementation of networks will be familiar to those of skill in the art. A network management system according to the invention preferably resides and executes on networked computers such as the computers 902, 908, 910 and 912 and operates to manage the large overall network in a distributed manner while providing the ability to share critical network management information.

Figure 10:
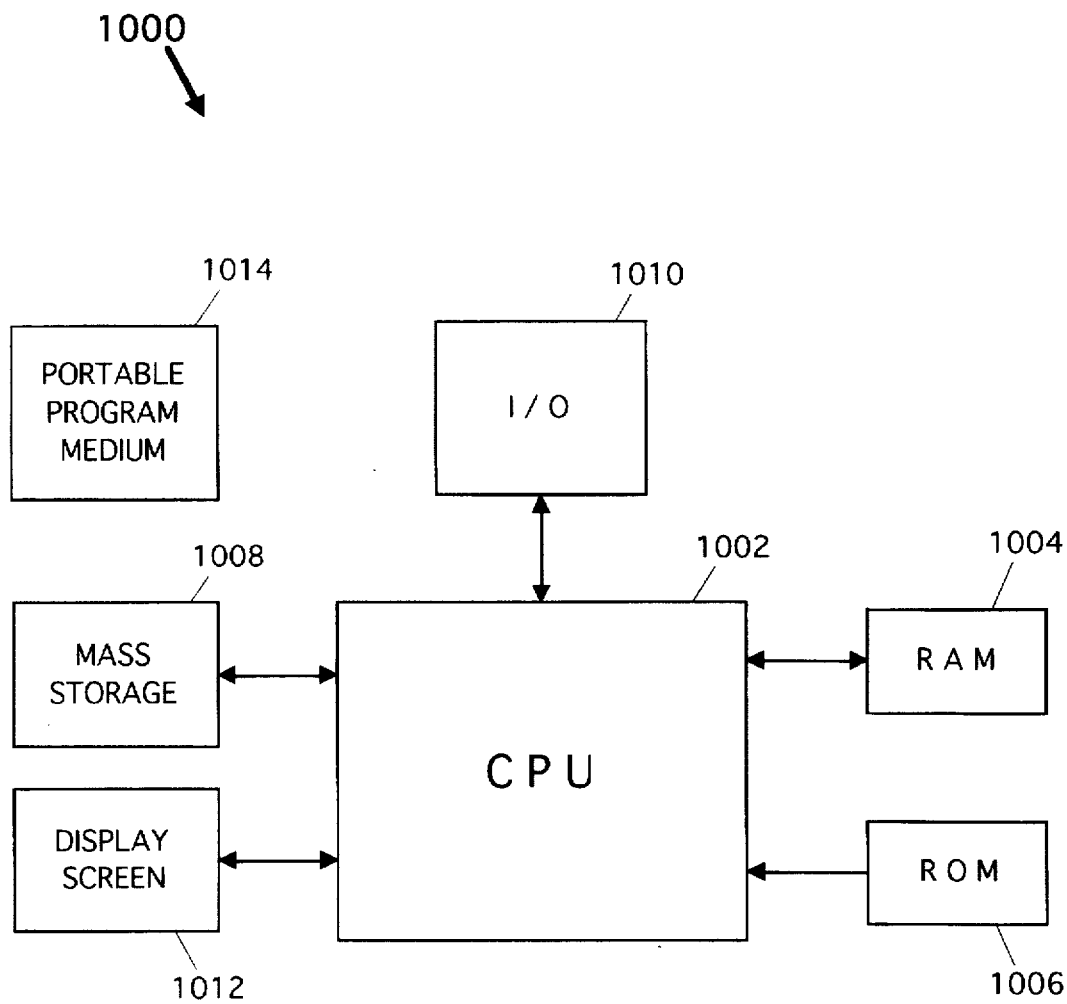
FIG. 10 is a block diagram of a representative computer suitable for use with the invention.

FIG. 10 is a block diagram of a representative computer 1000 suitable for use with the invention. The representative computer 1000 is suitable for use as computers 902, 908, 910, and/or 912 of FIG. 9. The computer 1000 includes a central processing unit (CPU) 1002 which is coupled bidirectionally with random access memory (RAM) 1004 and unidirectionally with read only memory (ROM) 1006. Typically, the RAM 1004 is used as a "scratch pad" memory and includes programming instructions and data, including distributed objects and their associated code and state, for processes currently operating on the CPU 1002. The ROM 1006 typically includes basic operating instructions, data and objects used by the computer to perform its functions. In addition, a mass storage device 1008, such as a hard disk, CD ROM, magneto-optical (floptical) drive, tape drive or the like, is coupled bidirectionally with the CPU 1002. Mass storage device 1008 generally includes additional programming instructions, data and objects that typically are not in active use by the CPU, although the address space may be accessed by the CPU 1002, e.g., for virtual memory or the like. The computer 1002 may optionally include an input/output source 1010 that typically includes input media such as a keyboard, pointer devices (e.g., a mouse or stylus) and/or network connections. Additional mass storage devices (not shown) may also be connected to the CPU 1002 through a network connection. The computer 1000 further includes a display screen 1012 for viewing text and images generated or displayed by the computer system 1000. The CPU 1002 together with an operating system (not shown) operate to execute computer code. The computer code may reside on the RAM 1004, the ROM 1006, or a mass storage device 1008. The computer code could also reside on a portable program medium 1014 and then be loaded or installed onto the computer 1000 when needed. Portable program mediums 1014 include, for example, CD-ROMs, PC Card devices, RAM devices, floppy disk, magnetic tape.

Additional details pertaining to the invention can be found in "Cooperative ConSoleS™ 1.0 Administrator's Guide," available from Sun Microsystems, Inc. of Mountain View, Calif., which is hereby incorporated by reference.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A network management system for sharing information between a plurality of distributed network managers, said system comprising:

a sending machine including at least a first network manager for managing a first network, said first network manager receiving event and trap information from agents associated with the first network;

an authorization list containing information indicating whether receiving machines are authorized to receive the event and trap information; and a sender process, operatively coupled to said first network manager, for receiving the event and trap information received by said first network manager;

a receiving machine including at least a second network manager for managing a second network;

a receiver process for receiving the event and trap information; and a registration list for identifying sender machines to which said receiving machine is to connect to receive event and trap information; and a communication link connecting said sending machine and said receiving machine, wherein said sender process forwards the event and trap information to said receiving machine if said authorization list authorizes said receiving machine to receive the event and trap information, and wherein said receiver process forwards the event and trap information received from the sender process to said second network manager for processing thereof.

2. A network management system as recited in claim 1, wherein said sender process filters the event and trap information, and then forwards the filtered event and trap information to said receiving machine if said authorization list authorizes said receiving machine to receive the event and trap information.

3. A network management system as recited in claim 2, wherein said sending machine further includes a filter file containing filter tables, the filter tables are utilized by said sender process to filter the event and trap information.

4. A network management system as recited in claim 1, wherein said first network manager maintains a first database and said second network manager maintains a second database, wherein said sender process receives a synchronization request from said receiver process and in response thereto generates a database trap for each record in the first database and then forwards the database traps to said receiver process, and wherein said receiver process receives the database traps from said sender process and then synchronizes the second database to the first database in accordance with the database traps.

5. A system as recited in claim 1, wherein the second network is distinct from the first network.

6. A network management system for sharing information between a plurality of distributed network managers, said system comprising:

a first network manager for managing a first network;

a second network manager for managing a second network;

information sharing means for sharing information between said first network manager and said second network manager; and an authorization list containing information indicating whether said second network manager is are authorized to receive the information from wherein said information sharing means operates to forwards the information to said second network manager if said authorization list authorizes said second network manager to receive the information.

7. A system as recited in claim 6, wherein the second network is distinct from the first network, and wherein the information being shared includes event or trap information.

8. A system as recited in claim 7, wherein the first network includes a first set of agents and the second network includes a second set of agents, and wherein each of the agents generates events or traps, and wherein the information being shared between said first and second network managers includes one or more of the events or traps generated by the agents.

9. A system as recited in claim 6, wherein said information sharing means comprises:

filter means for filtering the information before being transferred to said second network manager; and means for transferring the filtered information from said first network manager to said second network manager.

10. A system as recited in claim 9, wherein said first network manager maintains a first database of topology data for the first network and the second network manager maintains a second database of topology data for the second network, and wherein said system further comprises means for automatically synchronizing topology data between said first and second databases.

11. A network management system for sharing information between a plurality of distributed network managers, said system comprising a first network manager for managing a first network, a second network manager for managing a second network; and information sharing means for sharing topology data between said first network manager and said second network manager, said first network manager maintains a first database of topology data for the first network and the second network manager maintains a second database of topology data for the second network, and said information sharing means automatically synchronizes topology data between said first and second databases.

12. A computer-implemented method for sharing network management data between first and second network managers, the first network manager locally managing a first network, and the second network manager locally managing a second network, said method comprising the steps of:

(a) connecting a receiver process associated with the second network to a sender process associated with the first network;

(b) receiving, at the sender process, network management data for the first network;

(c) forwarding the network management data from the sender process to the receiver process; and (d) processing the network management data in the second network manager.

13. A computer-implemented method as recited in claim 12, wherein the network management data includes event and trap data.

14. A computer-implemented method as recited in claim 13, wherein the trap data includes one or both of database traps and non-database traps.

15. A computer-implemented method as recited in claim 12, wherein said method further comprises: (e) filtering, prior to said forwarding (c), the network management data at the sender process to produce filtered data for the receiver process.

16. A computer-implemented method as recited in claim 12, wherein the first network manager maintains a first database and the second network manager maintains a second database, and wherein said method further comprises: (e) automatically synchronizing the second database to the first database.

17. A computer-implemented method as recited in claim 16, wherein said synchronizing (e) comprises the steps of:

(e1) sending a synchronization request from the receiver process to the sender process;

(e2) generating database traps for the entire contents of the first database;

(e3) forwarding the database traps to the receiver process; and (e4) updating the second database in accordance with the database traps.

18. A computer-implemented method as recited in claim 17, wherein said synchronizing (e) further comprises the step of: (e5) filtering the database traps prior to said forwarding (e3) and said updating (e4).

19. A computer-implemented method for sharing network management data between first and second network managers, the first network manager locally managing a first network, and the second network manager locally managing a second network, said method comprising the steps of:

(a) connecting a receiver process associated with the second network to a sender process associated with the first network;

(b) receiving, at the sender process, network management data for the first network;

(c) filtering the network management data at the sender process to produce filtered data for the receiver process;

(d) forwarding the filtered data from the sender process to the receiver process; and (e) processing the filtered data in the second network manager.

20. A computer-implemented method as recited in claim 19, wherein said filtering (c) comprises the steps of:

(c1) providing a filter table to the sender process; and (c2) filtering the network management data at the sender process in accordance with the filter table.

21. A computer-implemented method as recited in claim 20, wherein during said connection (a), the receiver process identifies the filter table to the sender process.

22. A computer-implemented method as recited in claim 20, wherein the first and second networks include network elements and network domains, wherein said filtering (c2) filters out at least a portion of the network management data based on one of a type of network elements or a name of network domains.

23. A computer-implemented method as recited in claim 19, wherein the first network manager maintains a first database and the second network manager maintains a second database, and wherein said method further comprises: (f) automatically synchronizing the second database to the first database.

24. A computer-implemented method as recited in claim 19, wherein said synchronizing (f) comprises the steps of:

(f1) sending a synchronization request from the receiver process to the sender process;

(f2) generating database traps for the entire contents of the first database;

(f3) forwarding the database traps to the receiver process; and (f4) updating the second database in accordance with the database traps.

25. A computer-implemented method as recited in claim 24, wherein said synchronizing (f) further comprises the step of: (f5) filtering the database traps prior to said forwarding (f3) and said updating (f4).

26. A computer program product, comprising:

a computer usable medium having computer readable code embodied therein to implement sharing of network management data between first and second network managers, the first network manager locally manages a first network and the second network manager locally manages a second network, and wherein said computer readable code comprises:

first computer readable program code devices configured to cause a computer to effect connecting a receiver process associated with the second network to a sender process associated with the first network;

second computer readable program code devices configured to cause a computer to effect receiving, at the sender process, network management data for the first network;

third computer readable program code devices configured to cause a computer to effect forwarding the network management data from the sender process to the receiver process; and fourth computer readable program code devices configured to cause a computer to effect processing the network management data in the second network manager.

27. A computer program product as recited in claim 26, wherein the network management data includes event and trap data, and wherein the trap data includes one or both of database traps and non-database traps.

28. A computer program product as recited in claim 26, wherein said computer readable code further comprises:

fifth computer readable program code devices configured to cause a computer to effect filtering of the network management data at the sender process to produce filtered data, and wherein said third computer readable program code devices are configured to cause a computer to effect forwarding of the filtered data from the sender process to the receiver process.

29. A computer program product as recited in claim 26, wherein the first network manager maintains a first database and the second network manager maintains a second database, and wherein said computer readable code further comprises:

fifth computer readable program code devices configured to cause a computer to effect synchronization of the second database to the first database.

30. A computer program product as recited in claim 29, wherein said fifth computer readable code devices comprises:

computer readable program code devices configured to cause a computer to effect sending a synchronization request from the receiver process to the sender process;

computer readable program code devices configured to cause a computer to effect generating database traps for the entire contents of the first database;

computer readable program code devices configured to cause a computer to effect forwarding the database traps to the receiver process; and computer readable program code devices configured to cause a computer to effect updating the second database in accordance with the database traps.

31. A computer program product as recited in claim 30, wherein said fifth computer readable code devices further comprises:

computer readable program code devices configured to cause a computer to effect filtering the database traps prior to their being forwarded to the receiver process.

32. A computer-implemented method for synchronizing a first database of a first network management station to a second database of a second network management station, comprising the steps of:

(a) sending a synchronization request from the second network management station to the first network management station to request synchronization of the second database to the first database;

(b) generating, at the first network management station, database traps for the entire contents of the first database;

(c) forwarding the database traps from the first network management station to the second network management station; and (d) updating the second database in accordance with the database traps.

33. A computer-implemented method as recited in claim 32, wherein said method further comprises the step of: (e) filtering the database traps prior to said forwarding (c) and said updating (d).

34. A computer program product, comprising:

a computer usable medium having computer readable code embodied therein to implement synchronization of a first database of a first network management station to a second database of a second network management station, and wherein said computer readable code comprises:

first computer readable program code devices configured to cause a computer to effect sending a synchronization request from the second network management station to the first network management station to request synchronization of the second database to the first database;

second computer readable program code devices configured to cause a computer to effect generating, at the first network management station, database traps for the entire contents of the first database;

third computer readable program code devices configured to cause a computer to effect forwarding the database traps from the first network management station to the second network management station; and fourth computer readable program code devices configured to cause a computer to effect updating the second database in accordance with the database traps.

35. A computer program product as recited in claim 34, wherein said computer readable code devices further comprises:

fifth computer readable program code devices configured to cause a computer to effect filtering the database traps prior to the forwarding by said third computer readable program code devices.

36. A computer-implemented method as recited in claim 19, wherein said connecting (a) comprises:

(a1) determining whether the receiver process of the second network is authorized to receive the network management data from the sender process of the first network; and (a2) connecting the receiver process associated with the second network to the sender process associated with the first network if said determining (a1) determines that the receiver process is authorized to receive the network management data from the sender process.

37. A computer program product as recited in claim 26, wherein said first computer readable program code devices include:

computer readable program code for determining whether the receiver process of the second network is authorized to receive the network management data from the sender process of the first network; and computer readable program code for connecting the receiver process associated with the second network to the sender process associated with the first network if said determining (a1) determines that the receiver process is authorized to receive the network management data from the sender process.

* * * * *